(12) United States Patent
Golov

(10) Patent No.: US 12,399,655 B2
(45) Date of Patent: Aug. 26, 2025

(54) PARALLEL MEMORY ACCESS AND COMPUTATION IN MEMORY DEVICES

(71) Applicant: Micron Technology, Inc., Boise, ID (US)

(72) Inventor: Gil Golov, Backnang (DE)

(*) Notice: Subject to any disclaimer, the term of this patent is extended or adjusted under 35 U.S.C. 154(b) by 0 days.

(21) Appl. No.: 17/483,786

(22) Filed: Sep. 23, 2021

(65) Prior Publication Data

US 2022/0011982 A1 Jan. 13, 2022

Related U.S. Application Data

(63) Continuation of application No. 16/158,593, filed on Oct. 12, 2018, now Pat. No. 11,157,213.

(51) Int. Cl.
*G06F 3/06* (2006.01)
*G06N 3/06* (2006.01)
*G06N 5/04* (2023.01)

(52) U.S. Cl.
CPC .......... *G06F 3/0673* (2013.01); *G06F 3/0604* (2013.01); *G06F 3/0646* (2013.01); *G06N 3/06* (2013.01); *G06N 5/04* (2013.01)

(58) Field of Classification Search
CPC .... G06F 3/0673; G06F 3/0604; G06F 3/0646; G06F 3/0659; G06F 3/068; G06F 3/0613;
(Continued)

(56) References Cited

U.S. PATENT DOCUMENTS 5,038,312 A 8/1991 Kojima
5,862,396 A 1/1999 Motomura
(Continued)

FOREIGN PATENT DOCUMENTS

CN 104701309 A 6/2015
CN 105789139 A 7/2016
(Continued)

OTHER PUBLICATIONS

International Search Report and Written Opinion, PCT/US2019/056710, mailed Feb. 5, 2020.
(Continued)

*Primary Examiner* — Khoa D Doan
(74) *Attorney, Agent, or Firm* — Greenberg Traurig

(57) ABSTRACT

An integrated circuit (IC) memory device encapsulated within an IC package. The memory device includes first memory regions configured to store lists of operands; a second memory region configured to store a list of results generated from the lists of operands; and at least one third memory region. A communication interface of the memory device can receive requests from an external processing device; and an arithmetic compute element matrix can access memory regions of the memory device in parallel. When the arithmetic compute element matrix is processing the lists of operands in the first memory regions and generating the list of results in the second memory region, the external processing device can simultaneously access the third memory region through the communication interface to load data into the third memory region, or retrieve results that have been previously generated by the arithmetic compute element matrix.

23 Claims, 8 Drawing Sheets

(58) Field of Classification Search
CPC .......... G06F 7/57; G06F 17/16; G06F 3/0679; G06F 3/061; G06F 3/0656; G06N 3/06; G06N 5/04; G06N 3/0481; G06N 3/063; G06N 3/08; G06N 3/0454; G06N 3/04; G06N 3/0445; G06N 20/00; G06N 3/048
See application file for complete search history.

(56) References Cited

U.S. PATENT DOCUMENTS

| | | | |
|---|---|---|---|
| 6,279,088 B1* | 8/2001 | Elliott | G06F 15/8015 711/155 |
| 7,234,042 B1 | 6/2007 | Wilson | |
| 8,185,571 B2* | 5/2012 | Peleg | G06F 7/4812 708/524 |
| 8,327,194 B1 | 12/2012 | Sabih | |
| 8,521,958 B2* | 8/2013 | Walker | G06F 9/3877 711/119 |
| 9,535,876 B2 | 1/2017 | Walker | |
| 10,073,733 B1 | 9/2018 | Jain et al. | |
| 10,394,753 B2 | 8/2019 | Walker | |
| 10,461,076 B1 | 10/2019 | Brewer | |
| 10,910,366 B2 | 2/2021 | Brewer | |
| 10,963,738 B2 | 3/2021 | Geraci et al. | |
| 11,157,213 B2 | 10/2021 | Golov | |
| 11,688,734 B2 | 6/2023 | Brewer | |
| 2006/0253690 A1* | 11/2006 | Chen | G06F 9/3828 712/241 |
| 2008/0168256 A1 | 7/2008 | Wong | |
| 2009/0303767 A1 | 12/2009 | Akerib et al. | |
| 2010/0035454 A1 | 2/2010 | Morgan et al. | |
| 2010/0312990 A1 | 12/2010 | Walker | |
| 2010/0312999 A1 | 12/2010 | Walker | |
| 2010/0313000 A1 | 12/2010 | Walker | |
| 2012/0265964 A1 | 10/2012 | Murata et al. | |
| 2014/0032459 A1 | 1/2014 | Sinyavskiy et al. | |
| 2014/0136903 A1 | 5/2014 | Hyde et al. | |
| 2014/0172762 A1 | 6/2014 | Suri et al. | |
| 2015/0106574 A1* | 4/2015 | Jayasena | G06F 15/7821 711/154 |
| 2015/0356009 A1 | 12/2015 | Wheeler et al. | |
| 2016/0092323 A1 | 3/2016 | Moscovici et al. | |
| 2016/0098276 A1 | 4/2016 | Du et al. | |
| 2016/0133310 A1 | 5/2016 | Wilson et al. | |
| 2016/0148918 A1* | 5/2016 | Ye | H01L 23/3128 438/107 |
| 2016/0266899 A1 | 9/2016 | Tiwari | |
| 2017/0140821 A1 | 5/2017 | Mazed | |
| 2017/0154257 A1 | 6/2017 | Cao et al. | |
| 2017/0168817 A1 | 6/2017 | Walker | |
| 2017/0235511 A1* | 8/2017 | Palmer | G06F 3/067 711/154 |
| 2017/0255390 A1* | 9/2017 | Chang | G06F 3/0605 |
| 2017/0269865 A1 | 9/2017 | Willcock et al. | |
| 2017/0270403 A1 | 9/2017 | Zhang | |
| 2017/0322774 A1 | 11/2017 | Zhang | |
| 2017/0324829 A1* | 11/2017 | Voronkov | G06F 12/0875 |
| 2017/0344301 A1 | 11/2017 | Ryu et al. | |
| 2018/0095758 A1* | 4/2018 | Dubtsov | G06F 9/3001 |
| 2018/0189230 A1* | 7/2018 | Cargnini | G06F 9/44505 |
| 2018/0285727 A1* | 10/2018 | Baum | G06N 3/02 |
| 2018/0300271 A1* | 10/2018 | Choe | G06F 13/1668 |
| 2018/0349290 A1* | 12/2018 | Staudenmaier | G06F 13/28 |
| 2019/0042251 A1* | 2/2019 | Nurvitadhi | G06F 15/7821 |
| 2019/0103160 A1 | 4/2019 | Fang et al. | |
| 2019/0114170 A1 | 4/2019 | Zhang | |
| 2019/0146788 A1* | 5/2019 | Kim | G11C 11/54 712/221 |
| 2019/0180183 A1 | 6/2019 | Diamant et al. | |
| 2019/0235780 A1 | 8/2019 | DeBenedictis | |
| 2019/0251396 A1 | 8/2019 | Geraci et al. | |
| 2019/0370221 A1 | 12/2019 | Walker | |
| 2019/0378016 A1 | 12/2019 | John et al. | |
| 2020/0004514 A1* | 1/2020 | Yu | G06F 9/30123 |
| 2020/0005142 A1* | 1/2020 | Lie | G06N 3/02 |
| 2020/0117400 A1 | 4/2020 | Golov | |
| 2020/0117449 A1 | 4/2020 | Golov | |
| 2020/0135720 A1 | 4/2020 | Brewer | |
| 2021/0151431 A1 | 5/2021 | Brewer | |

FOREIGN PATENT DOCUMENTS

| | | |
|---|---|---|
| CN | 108256637 A | 12/2016 |
| JP | H03188552 | 8/1991 |
| JP | H0954675 | 2/1997 |
| WO | 2019118363 | 6/2019 |

OTHER PUBLICATIONS

Vivienne Sze, Yu-Hsin Chen, Joel Emer, Amr Suleiman, Zhengdong Zhang, "Hardware for Machine Learning: Challenges and Opportunities", Aug. 1, 2017.
Wikipedia, "Dot Product," retrieved from the Internet <https://en.wikipedia.org/wiki/Dot_product> on Apr. 23, 2021.
Duckhwan Kim, et al. "NeuroCube: A Programmable Digital Neuromorphic Architecture with High-Density 3D Memory." IEEE, Aug. 25, 2016.
Tao, Li, et al., "Design and Implementation of Processing Element of Polymorpous Array Architecture for Graphics and Image Processing." Journal of Xi'an University of Posts and Telecommunications, Mar. 31, 2015.
Kim, Duckwan, et al., "NeuroCube: A Programmable Digital Neuromorphic Architecture with High-Density 3D Memory." Gigascale Reliable Energy Efficient Nanosystem (GREEN) Lab, School of Electrical and Computer Engineering, Georgia Tech, Aug. 25, 2016.
Kim, Duckwan, et al., "Neurocube: A Programmable Digital Neuromorphic Architecture with High-Density 3D Memory." 2016 ACM/IEEE 43rd Annual International Symposium on Computer Architecture, IEEE, 2016.
Wu, Yan, "Diagnosis, Treatment and Prediction of Premature Ovarian Failure." Huazhong University of Science & Technology Press, Sep. 2017.
Yang, Zhengze, et al., "China Manufacturing 2025 High-end CNC Machine Tools and Robots." Shandong Science and Technology Press, Apr. 2018.
Zhang, Yingwei, et al., "Fault Diagnosis of Complex Industrial Processes." Northeastern University Press, Dec. 2007.

* cited by examiner

PARALLEL MEMORY ACCESS AND COMPUTATION IN MEMORY DEVICES

RELATED APPLICATIONS

The present application is a continuation application of U.S. patent application Ser. No. 16/158,593, filed Oct. 12, 2018, issued as U.S. Pat. No. 11,157,213 on Oct. 26, 2021, and entitled "Parallel Memory Access and Computation in Memory Devices," the entire disclosure of which application is hereby incorporated herein by reference.

The present application relates to U.S. patent application Ser. No. 16/158,558, filed Oct. 12, 2018, published as U.S. Pat. App. Pub. No. 2020/0117449 on Apr. 16, 2020, and entitled "Accelerated Access to Computations Results Generated from Data Stored in Memory Devices," the entire disclosure of which is hereby incorporated herein by reference.

FIELD OF THE TECHNOLOGY

At least some embodiments disclosed herein relate to memory systems in general, and more particularly, but not limited to acceleration of access to computations results generated from data stored in memory devices.

BACKGROUND

Some computation models use numerical computation of large amounts of data in the form of row vectors, column vectors, and/or matrices. For example, the computation model of an Artificial neural network (ANN) can involve summation and multiplication of elements from row and column vectors.

There is an increasing interest in the use of artificial neural networks for artificial intelligence (AI) inference, such as the identification of events, objects, patterns that are captured in various data sets, such as sensor inputs.

In general, an artificial neural network (ANN) uses a network of neurons to process inputs to the network and to generate outputs from the network.

For example, each neuron m in an artificial neural network (ANN) can receive a set of inputs $p_k$, where k=1, 2, ..., n. In general, some of the inputs $p_k$ to a typical neuron m may be the outputs of certain other neurons in the network; and some of the inputs $p_k$ to the neuron m may be the inputs to the network as a whole. The input/output relations among the neurons in the network represent the neuron connectivity in the network.

A typical neuron m can have a bias $b_m$, an activation function $f_m$, and a set of synaptic weights $w_{mk}$ for its inputs $p_k$ respectively, where k=1, 2, ..., n. The activation function may be in the form of a step function, a linear function, a log-sigmoid function, etc. Different neurons in the network can have different activation functions.

The typical neuron m generates a weighted sum $s_m$ of its inputs and its bias, where $s_m = b_m + w_{m1} \times p_1 + w_{m2} \times p_2 + \ldots + w_{mn} \times p_n$. The output $a_m$ of the neuron m is the activation function of the weighted sum, where $a_m = f_m(s_m)$.

The relations between the input(s) and the output(s) of an ANN in general are defined by an ANN model that includes the data representing the connectivity of the neurons in the network, as well as the bias $b_m$, activation function $f_m$, and synaptic weights $w_{mk}$ of each neuron m. A computing device can be used to compute the output(s) of the network from a given set of inputs to the network based on a given ANN model.

For example, the inputs to an ANN network may be generated based on camera inputs; and the outputs from the ANN network may be the identification of an item, such as an event or an object.

In general, an ANN may be trained using a supervised method where the synaptic weights are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs is not known a priori before the completion of the training. The ANN can be trained to classify an item into a plurality of categories, or group data points into clusters.

Multiple training algorithms are typically employed for a sophisticated machine learning/training paradigm.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
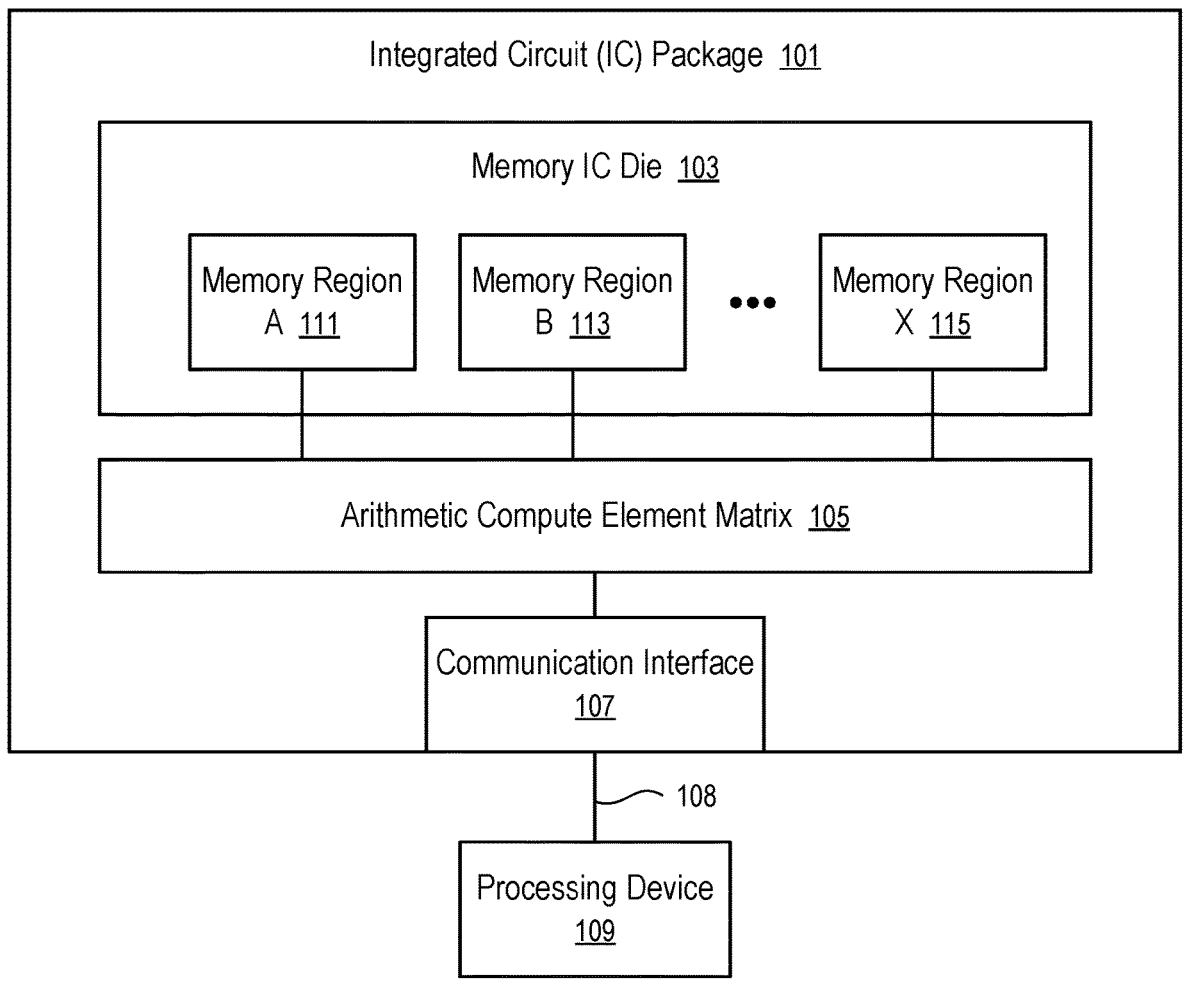
FIG. 1 shows a system having a memory device configured according to one embodiment.

At least some aspects of the present disclosure are directed to a memory device configured with arithmetic computation units to perform computations on data stored in the memory device. The memory device can optionally generate a computation result on the fly in response to a command to read data from a memory location and provide the computation result as if the result had been stored in the memory device. The memory device can optionally generate a list of results from one or more lists of operands and store the list of results in the memory device. The memory device can include multiple memory regions that can be accessed in parallel. Some of the memory regions can be accessed in parallel by the memory device to obtain operands and/or store results for the computation in the arithmetic computation units. The arithmetic computation units can optionally perform a same set of arithmetic computations for multiple data sets in parallel. Further, a list of results computed in parallel can be combined through summation as an output from the memory device, or cached in the memory device for transmission as a response to a command to the memory device, or stored in a memory region. Optionally, the memory device can allow parallel access to a memory region by an external processing device, and to one or more other memory regions by the arithmetic computation units.

The computation results of such a memory device can be used in data intensive and/or computation intensive applications, such as the use of an Artificial neural network (ANN) for artificial intelligence (AI) inference.

However, a dataset of an ANN model can be too large to be stored in a typical processing device, such as a system on chip (SoC) or a central processing unit (CPU). When the internal static random access memory (SRAM) of a SoC or the internal cache memory of a CPU is insufficient to hold the entire ANN model, it is necessary to store the dataset in a memory device, such as a memory device having dynamic random access memory (DRAM). The processing device may retrieve a subset of data of the ANN model from the memory device, store the set of data in the internal cache memory of the processing device, perform computations using the cached set of data, and store the results back to the memory device. Such an approach is inefficient in power and bandwidth usages due to the transfer of large datasets between the processing device and the memory device over a conventional memory bus or connection.

At least some embodiments disclosed herein provide a memory device that have an arithmetic logic unit matrix configured to pre-process data in the memory device before transferring the results over a memory bus or a communication connection to a processing device. The pre-processing performed by the arithmetic logic unit matrix reduces the amount of data to be transferred over the memory bus or communication connection and thus reduces power usage of the system. Further, the pre-processing performed by the arithmetic logic unit matrix can increase effective data throughput and the overall performance of the system (e.g., in performing AI inference).

FIG. 1 shows a system having a memory device configured according to one embodiment.

The memory device in FIG. 1 is encapsulated within an integrated circuit (IC) package (101). The memory device includes a memory IC die (103), an arithmetic compute element matrix (105), and a communication interface (107).

Optionally, the arithmetic compute element matrix (105) and/or the communication interface (107) can be formed on an IC die separate from the memory IC die (103), or formed on the same memory IC die (103).

When the arithmetic compute element matrix (105) and the communication interface (107) are formed on an IC die separate from the memory IC die (103), the IC dies can be connected via through-silicon via (TSV) for improved interconnectivity between the dies and thus improved communication bandwidth between the memory formed in the memory IC die (103) and the arithmetic processing units in the die of the arithmetic compute element matrix (105). Alternatively, wire bonding can be used to connect the separate dies that are stacked within the same IC package (101).

The memory formed in the memory IC die (103) can include dynamic random access memory (DRAM) and/or cross-point memory (e.g., 3D XPoint memory). In some instances, multiple memory IC dies (103) can be included in the IC package (101) to provide different types of memory and/or increased memory capacity.

Cross-point memory has a cross-point array of non-volatile memory cells. A cross-point array of non-volatile memory can perform bit storage based on a change of bulk resistance, in conjunction with a stackable cross-gridded data access array. Additionally, in contrast to many flash memory, memory cells of cross-point memory are transistor-less memory elements; and cross point non-volatile memory can perform a write in-place operation, where a non-volatile memory cell can be programmed without the non-volatile memory cell being previously erased. Each memory element of a cross point memory can have a memory cell and a selector that are stacked together as a column. Memory element columns are connected via two perpendicular layers of wires, where one layer is above the memory element columns and the other layer below the memory element columns. Each memory element can be individually selected at a cross point of one wire on each of the two layers. Cross point memory devices are fast and non-volatile and can be used as a unified memory pool for processing and storage.

Preferably, the memory in the IC package (101) has a plurality of memory regions (111, 113, . . . , 115) that can be accessed by the arithmetic compute element matrix (105) in parallel.

In some instances, the arithmetic compute element matrix (105) can further access multiple data elements in each memory regions in parallel and/or operate on the multiple data elements in parallel.

For example, one or more of the memory regions (e.g., 111, 113) can store one or more lists of operands. The arithmetic compute element matrix (105) can perform the same set of operations for each data element set that includes an element from each of the one or more lists. Optionally, the arithmetic compute element matrix (105) can perform the same operation on multiple element sets in parallel.

For example, memory region A (111) can store a list of data elements $A_i$ for i=1, 2, . . . , n; and memory region B (113) can store another list of data elements $B_i$ for i=1, 2, . . . , n. The arithmetic compute element matrix (105) can compute $X_i = A_i \times B_i$ for i=1, 2, . . . , n; and the results $X_i$ can be stored in memory region X (115) for i=1, 2, . . . , n.

For example, each data set i of operands can include $A_i$ and $B_i$. The arithmetic compute element matrix (105) can read data elements $A_i$ and $B_i$ of the data set i in parallel from the memory region A (111) and the memory region B (113) respectively. The arithmetic compute element matrix (105) can compute and stored the result $X_i = A_i \times B_i$ in the memory region X (115), and then process the next data set i+1.

Alternatively, the arithmetic compute element matrix (105) can read k data sets in parallel to perform parallel computations for the k data sets in parallel. For example, the arithmetic compute element matrix (105) can read in parallel a set of k elements $A_{i+1}, A_{i+2}, \ldots A_{i+k}$ from the list stored in the memory region A (111). Similarly, the arithmetic compute element matrix (105) can read in parallel a set of k elements $B_{i+1}, B_{i+2}, \ldots, B_{i+k}$ from the list stored in the memory region B (113). The reading of the sets of k elements from the memory region A (111) and the memory region B (113) can be performed in parallel in some implementations. The arithmetic compute element matrix (105) can compute in parallel a set of k results $X_{i+1} = A_{i+1} \times B_{i+1}$, $X_{i+2} = A_{i+2} \times B_{i+2}, \ldots, X_{i+k} = A_{i+k} \times B_{i+k}$ and stores the results $X_{i+1}, X_{i+2}, \ldots, X_i + k$ in parallel to the memory region X (115).

Optionally, the arithmetic compute element matrix (105) can include a state machine to repeat the computation for k data sets for portions of lists that are longer than k. Alternatively, the external processing device (109) can issue multiple instructions/commands to the arithmetic compute element matrix (105) to perform the computation for various portions of the lists, where each instruction/command is issued to process up to k data sets in parallel.

In some implementations, the memory device encapsulated within the IC package (101) can perform a computation by the arithmetic compute element matrix (105) accessing some memory regions (e.g., 111, 113) to retrieve operands and/or store results, while simultaneously and/or concurrently allowing the external processing device (109) to access a separate memory region (e.g., 115) that is not involved in the operations of the arithmetic compute element matrix (105). Thus, the processing device (109) can access the separate memory region (e.g., 115) to store data for the next computation, or retrieve the results generated from a previously computation, during a time period in which the arithmetic compute element matrix (105) is used to access the memory regions (e.g., 111, 113) to perform the current computation.

In some instances, the arithmetic compute element matrix (105) can reduce the one or more lists of operand data elements into a single number. For example, memory region A (111) can store a list of data elements $A_i$ for i=1, 2, ..., n; and memory region B (113) can store another list of data elements $B_i$ for i=1, 2, ..., n. The arithmetic compute element matrix (105) can compute $S=A_1 \times B_1 + A_2 \times B_2 + \ldots + A_i \times B + \ldots + A_n \times B_n$; and the result S can be provided as an output for transmission through the communication interface (107) to the external processing device (109) in response to a read command that triggers the computation of S.

For example, the external processing device (109) can be a SoC chip. For example, the processing device (109) can be a central processing unit (CPU) or a graphics processing unit (GPU) of a computer system.

The communication connection (108) between the communication can be in accordance with a standard for a memory bus, or a serial or parallel communication connection. For example, the communication protocol over the connection (108) can be in accordance with a standard for a serial advanced technology attachment (SATA) connection, a peripheral component interconnect express (PCIe) connection, a universal serial bus (USB) connection, a Fibre Channel, a Serial Attached SCSI (SAS) connection, a double data rate (DDR) memory bus, etc.

In some instances, the communication connection (108) further includes a communication protocol for the external processing device (109) to instruct the arithmetic compute element matrix (105) to perform a computation and/or for the memory device to report the completion of a previously requested computation.

Figure 2:
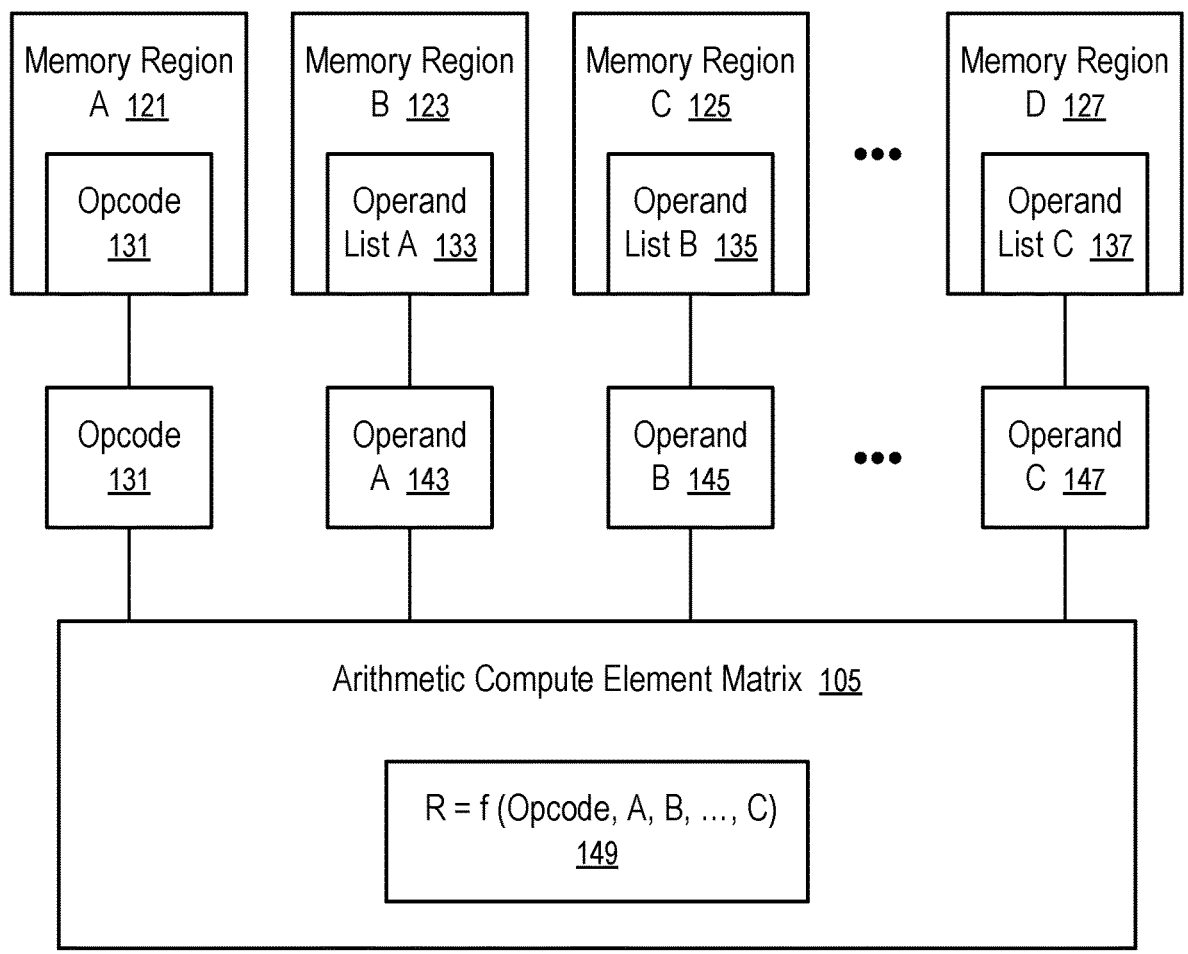
FIG. 2 shows a portion of a memory device configured to perform computation on vectors of data elements according to one embodiment.

FIG. 2 shows a portion of a memory device configured to perform computation on vectors of data elements according to one embodiment. For example, the arithmetic compute element matrix (105) and memory regions (121, 123, 125, ..., 127) of FIG. 2 can be implemented in the memory device of FIG. 1.

In FIG. 2, a memory region A (121) is configured to store an opcode (131) that is a code identifying the operations to be performed on operands in a set of memory regions (123, 125, ..., 127). In general, an opcode (131) may use one or more memory regions (123, 125, ..., 127).

Data elements of a vector can be stored as a list of data elements in a memory region. In FIG. 2, memory regions (123, 125, ..., 127) are configured to store lists (133, 135, ..., 137) of operands. Each set of operands includes one element (143, 145, ..., 147) from each of the lists (133, 135, ..., 137) respectively. For each set of operands, the arithmetic compute element matrix (105) computes a result that is a function of the opcode (131), and the operand elements (143, 145, ..., 147).

In some instances, the list of results is reduced to a number (e.g., through summation of the results in the list). The number can be provided as an output to a read request, or stored in a memory region for access by the external processing device (109) connected to the memory device via a communication connection (108).

In other instances, the list of results is cached in the arithmetic compute element matrix (105) for next operation, or for reading by an external processing device (109) connected to the memory device via a communication connection (108).

In further instances, the list of results is stored back to one of the memory regions (123, 125, ..., 127), or to another memory region that does not store any of the operand lists (133, 135, ..., 137).

Optionally, the memory region A (121) can include a memory unit that stores the identifications of the memory regions (123, 125, ..., 127) of the operand lists (133, 135, ..., 137) for the execution of the opcode (131). Thus, the memory regions (123, 125, ..., 127) can be a subset of memory regions (111, 113, ..., 115) in the memory device encapsulated in the IC package (101); and the selection is based on the identifications stored in the memory unit.

Optionally, the memory region A (121) can include one or more memory units that store the position and/or size of the operand lists (133, 135, ..., 137) in the memory regions (123, 125, ..., 127). For example, the indices of the starting elements in the operand lists (133, 135, ..., 137), the indices of ending elements in the operand lists (133, 135, ..., 137), and/or the size of the lists (133, 135, ..., 137) can be specified for the memory region A (121) for the opcode (131).

Optionally, the memory region A (121) can include one or more memory units that store one or more parameters used in the computation (149). An example of such parameters is a threshold T that is independent of the data sets to be evaluated for the computation (149), as in some of the examples provided below.

Different opcodes can be used to request different computations on the operands. For example, a first opcode can be used to request the result of R=A×B; a second opcode can be used to request the result of R=A+B; a third opcode can be used to request the result of R=A×B+C; a fourth opcode can be used to request the result of R=(A×B)>T?A×B: 0, where T is threshold specified for the opcode (131).

In some instances, an opcode can include an optional parameter to request that the list of results be summed into a single number.

For example, the processing device (109) can prepare for the computation (149) by storing the operand lists (133, 135, ..., 137) in the memory regions (123, 125, ..., 127). Further, the processing device (109) stores the opcode (131) and the parameters of the opcode (131), if there is any, in predefined locations in the memory region A (121).

In one embodiment, in response to the processing device (109) issuing a read command to read the opcode (131) at its location (or another predefined location in the memory region (121), or another predefined location in the memory device encapsulated within the IC package (101)), the arithmetic compute element matrix (105) performs the computation (149), which is in general a function of the opcode (131), and the data elements in the operand lists (133, 135, ..., 137) (and the parameters of the opcode (131), if there is any). The communication interface (107) can provide the result(s) as a response to the read command.

In another embodiment, in response to the processing device (109) issuing a write command to store the opcode (131) in the memory region A (121), the arithmetic compute element matrix (105) performs the computation (149) and stores the result in its cache memory, in one of the operand memory regions (123, 125, . . . , 127), at the memory location of the opcode (131) to replace the opcode (131), or in another memory region (e.g., 121).

In some embodiments, when the communication protocol for the connection (108) between the memory device and the processing device (109) requires a predetermined timing for response, the memory device can provide a response of an estimated time to the completion of the result, as a response to the read command. The processing device (109) can retry to read until the result is obtained. In some instances, the arithmetic compute element matrix (105) stores and/or updates a status indicator of the computation (149) in a memory unit in the memory region (or in another predefined location in the memory device encapsulated within the IC package (101)).

Alternatively, another communication protocol can be used to instruct the arithmetic compute element matrix (105) to perform the computation (149), obtain a report of the completion of the computation (149), and then read the result(s) of the computation (149).

In general, the result(s) of the computation (149) can be a single number, or a list of numbers with a list size equal to that of the operand lists (133, 135, . . . , 137).

For example, the memory region B (123) can store a set of synaptic weights $w_{mk}$ for input $p_k$ to a neuron m, and its bias $b_m$; the memory region C (125) can store a set of inputs $p_k$ to the neuron m, and a unit input corresponding to the bias $b_m$. An opcode (131) can be configured for the computation (149) of the weighted sum $s_m$ of the inputs of the neuron m and its bias, where $s_m = b_m \times 1 + w_{m1} \times p_1 + w_{m2} \times p_2 + \ldots + w_{mn} \times p_n$. The weighted sum $s_m$ can be provided to the processing device (109), stored in a location identified by a parameter in the memory region (121) for the opcode (131), or stored back into the memory device at a location as instructed by the processing device (109).

Figure 3:
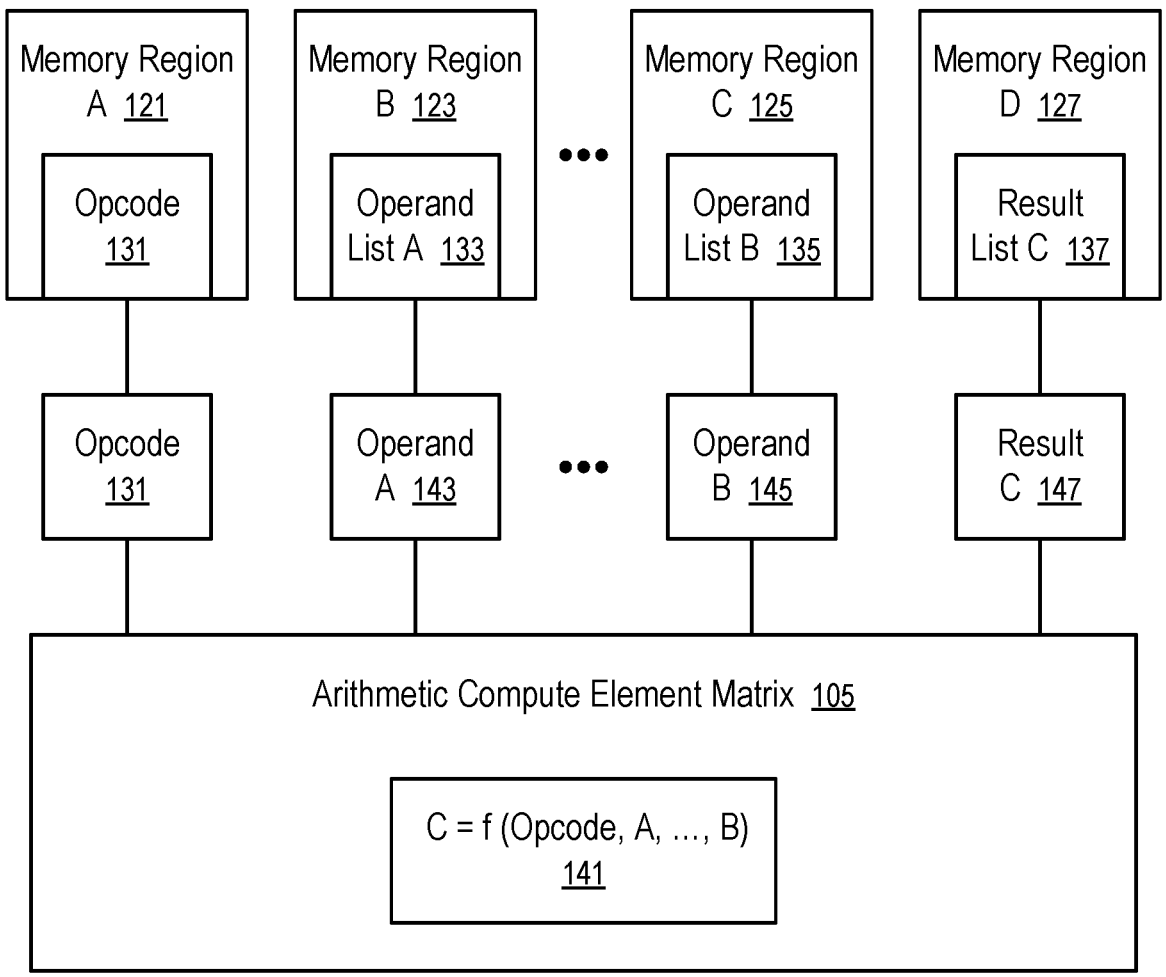
FIG. 3 shows a portion of a memory device configured to perform computation on vectors of data elements according to another embodiment.

FIG. 3 shows a portion of a memory device configured to perform computation on vectors of data elements according to another embodiment. For example, the arithmetic compute element matrix (105) and memory regions (121, 123, . . . , 125, 127) of FIG. 3 can be implemented in the memory device of FIG. 1 and, optionally, use some of the techniques discussed above in connection with FIG. 2.

In FIG. 3, the opcode (131) is retrieved from the memory region (121) for execution in the arithmetic compute element matrix (105). The computation (141) identified by the opcode (131) operates on the operands A (143), . . . , and B (145) that are retrieved from memory regions (123 and 125). The execution (141) stores a result list (137) in another memory region D (127).

After the arithmetic compute element matrix (105) completes the computation (141), the processing device (109) can read the results from the memory region D (127) using one or more read commands. During the time period in which the processing device (109) reads the results from the memory region D (127), the arithmetic compute element matrix (105) can perform the next computation.

In some implementation, the memory device can be configured to allow the arithmetic compute element matrix (105) to store the data in the memory region (127) while simultaneously allow the processing device (109) to read the memory region (115). Preferably, the memory device can place hold on requests for reading the portion of the result list (137) that has not yet obtained the results from the computation (141) and services with delay requests for reading the portion of the result list (137) that has obtained the results from the computation (141).

For example, the memory region B (123) can store a list of weighted sum $s_m$ of inputs to each neuron m and its bias $b_m$; and the computation (141) can be used to generate a list of outputs $a_m$ of the neuron m, where $a_m = f(s_m)$ and f is a predetermined activation function, such as a step function, a linear function, a log-sigmoid function, etc. In some instances, the memory region C (125) stores a parameter list specific to the activation function of each neuron m. For example, different neurons can have different activation functions; and the operand list (135) can be used to select the activation functions for the respective neurons. The result list (137) can be stored in the memory region D (127) for further operations. For example, the layer of neurons can provide their outputs $a_m$ as inputs to the next layer of neurons, where the weighted sums of the next layers of neurons can be further computed using the arithmetic compute element matrix (105).

Figure 4:
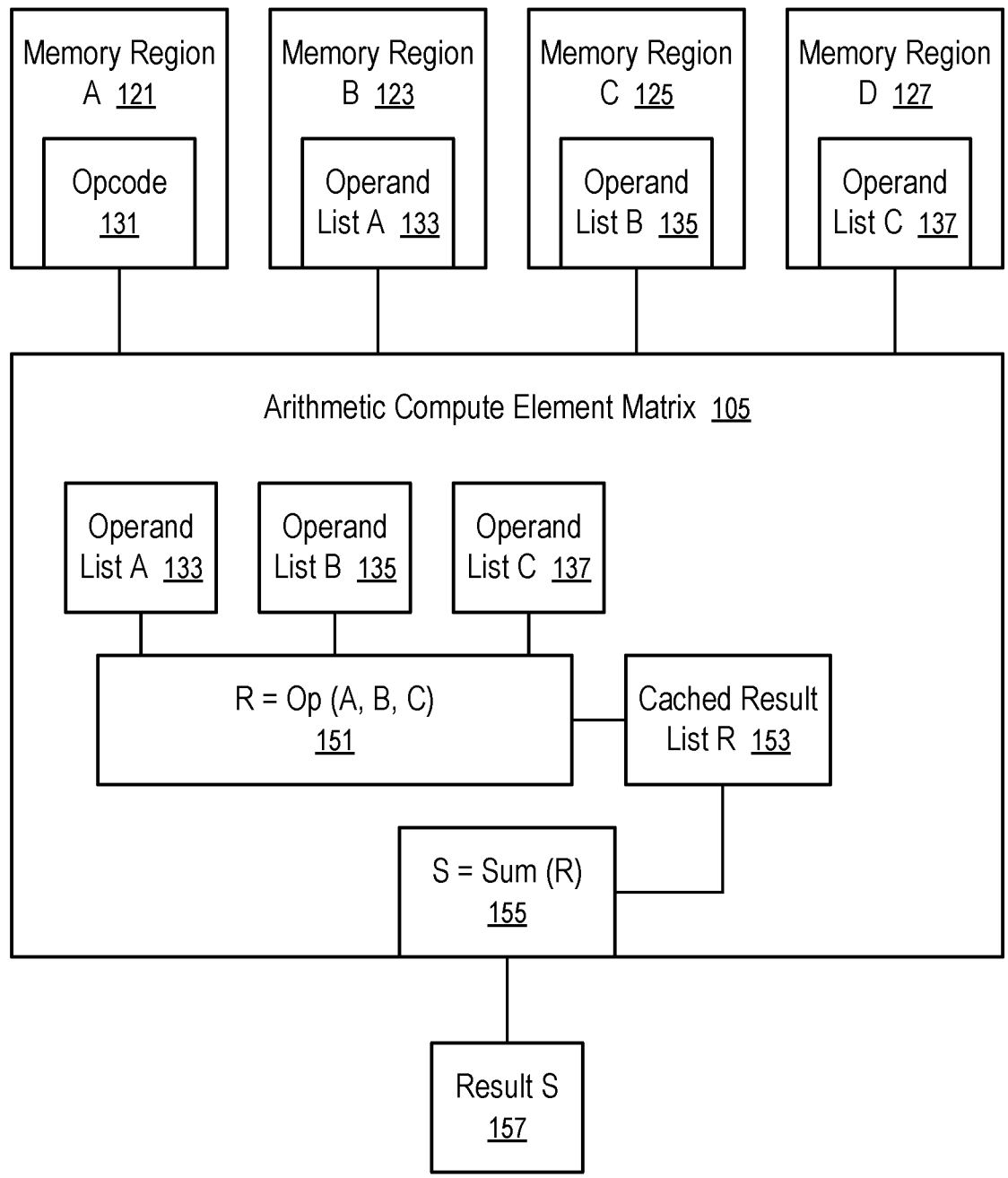
FIG. 4 shows an arithmetic compute element matrix configured to output a scalar result from vector inputs according to one embodiment.

FIG. 4 shows an arithmetic compute element matrix configured to output a scalar result from vector inputs according to one embodiment. For example, the arithmetic compute element matrix (105) and memory regions (121, 123, 125, 127) of FIG. 4 can be configured in the memory device of FIG. 1 and, optionally, use to implement the portion of the memory device illustrated in FIG. 2.

In FIG. 4, the opcode (131) uses three operand lists (133, 135, 137) to generate a scalar result S (157). In general, the opcode (131) can use more or fewer than three operand lists.

For example, in response to the opcode (131) and/or its associated parameters being stored in the memory region A (121), the arithmetic compute element matrix (105) retrieves an operand list A (133) in parallel from the memory region (123), retrieves an operand list B (135) in parallel from the memory region (125), and retrieves an operand list C (137) in parallel from the memory region (127). Optionally, the arithmetic compute element matrix (105) can concurrently load the lists (133, 135 and 137) from the memory regions (123, 125 and 127) respectively.

The arithmetic compute element matrix (105) has a set of arithmetic logic units that can perform the computation (151) in parallel to generate the cached result list R (153). A further set of arithmetic logic units sums (155) the result list (153) to generate a single output (157).

For example, one opcode can be configured to evaluate $R = A \times B + C$. For example, another opcode can be configured to evaluate $R = (A > B)?C:0$. For example, a further opcode can be configured to evaluate $R = (A \times B > C)?A \times B:0$.

For example, when the processing device (109) sends a read command to the memory device to read a memory location corresponding to the storage location of the opcode (131), the arithmetic compute element matrix (105) performs the computations (151 and 155) to generate the result (157) as a response to the read command. Thus, no special protocol is necessary for the use of the arithmetic compute element matrix (105).

Figure 5:
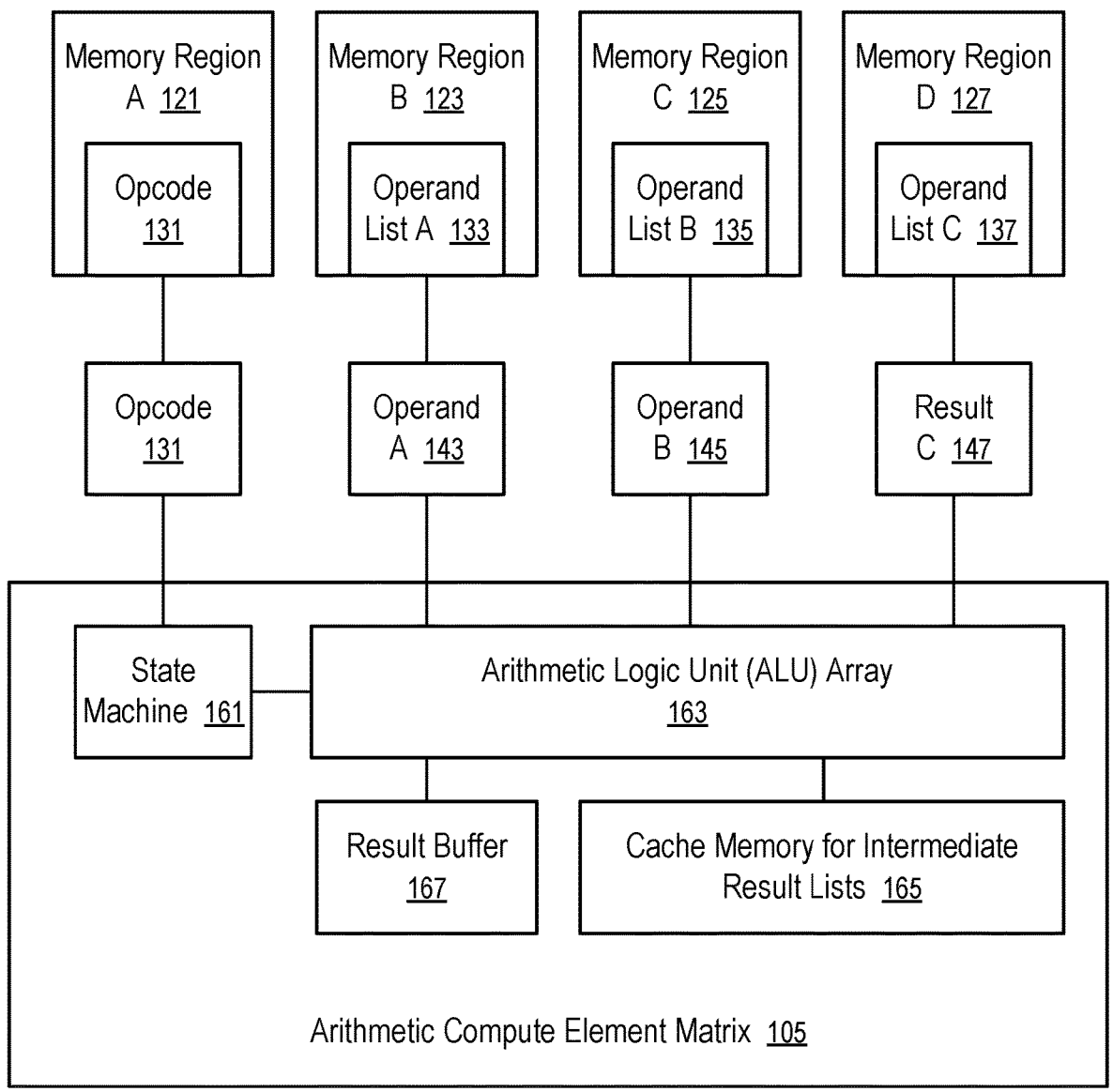
FIG. 5 shows an arithmetic compute element matrix controlled by a state machine to output a scalar result from vector inputs according to one embodiment.

FIG. 5 shows an arithmetic compute element matrix controlled by a state machine to output a scalar result from vector inputs according to one embodiment. For example, the arithmetic compute element matrix (105) and memory regions (121, 123, 125, 127) of FIG. 4 can be configured in the memory device of FIG. 1 and, optionally, use to implement the portion of the memory device illustrated in FIG. 2 or 4.

In FIG. 5, the arithmetic compute element matrix (105) includes a state machine (161) and an arithmetic logic unit (ALU) array (163). The state machine (161) uses the logic unit (ALU) array (163) to implement the opcode (131) and optionally its parameters.

For example, the state machine (161) can retrieve a data set (143, 145, 147) for the opcode (131), one at a time from the lists (133, 135, 137) stored in the memory regions (123, 125, 127). The arithmetic logic unit (ALU) array (163) can perform the operation of the opcode (131) on one data set (143, 145, 147) a time, store the intermediate results in the cache memory (165), repeat the calculation for different data sets, and combine the cached intermediate results (165) into a result stored in the buffer (167).

In some embodiment, the results in the cache memory (165) (e.g., from a previous calculation performed by the ALU array (163)) are also used as a list of operand for the execution of the opcode (131). For example, the current results of the ALU array (163) can be added to the existing results in the cache memory (165). For example, the existing results in the cache memory (165) can be selectively cleared (e.g., set to zero) based on whether the corresponding ones of current results of the ALU array (163) exceed a threshold.

For example, the state machine (161) can retrieve in parallel up to a predetermined number k of data sets, each containing one element (143, 145, 147) from each operand list (133, 135, and 137) for the opcode (131). The arithmetic logic unit (ALU) array (163) can perform in parallel the operation of the opcode (131) for up to the predetermined number k of data sets, store the intermediate results in the cache memory (165), repeat the calculation for different data sets in the lists (133, 135, . . . , 137), and optionally combine the cached intermediate results (165) into a result stored in the buffer (167). The communication interface (107) can provide the result from the buffer (167) as a response to a command or query from the processing device (109).

The state machine (161) allows the same arithmetic compute element matrix (105) to support a variety of operations defined by different opcodes (e.g., 131) and to process operand lists of variable lengths and/or locations.

Alternatively, the state machine (161) may be eliminated; and the arithmetic compute element matrix (105) can be configured to handle a predetermined number k of data sets at a time with operand lists of the size k stored at predefined locations in the memory regions (123, 125); and the external processing device (109) can control the processing sequences of data sets of the predetermined length k to effectuate the processing of data sets of other lengths.

Optionally, the result buffer (167) can be configured to provide a single result generated from the operand lists (133, 135, 137). The communication interface (107) of the memory device can provide the result as if the result were pre-stored at a memory location, in response to the processing device (109) reading the memory location.

Optionally, the result buffer (167) can be configured to provide a list of result generated from the operand lists (133, 135, 137). The communication interface (107) of the memory device can provide the list of result as if the result were pre-stored at a set of memory locations, in response to the processing device (109) reading the memory location. For example, the results can be provided via an NVM (non-volatile memory) Express (NVMe) protocol over a PCIe connection.

Figure 6:
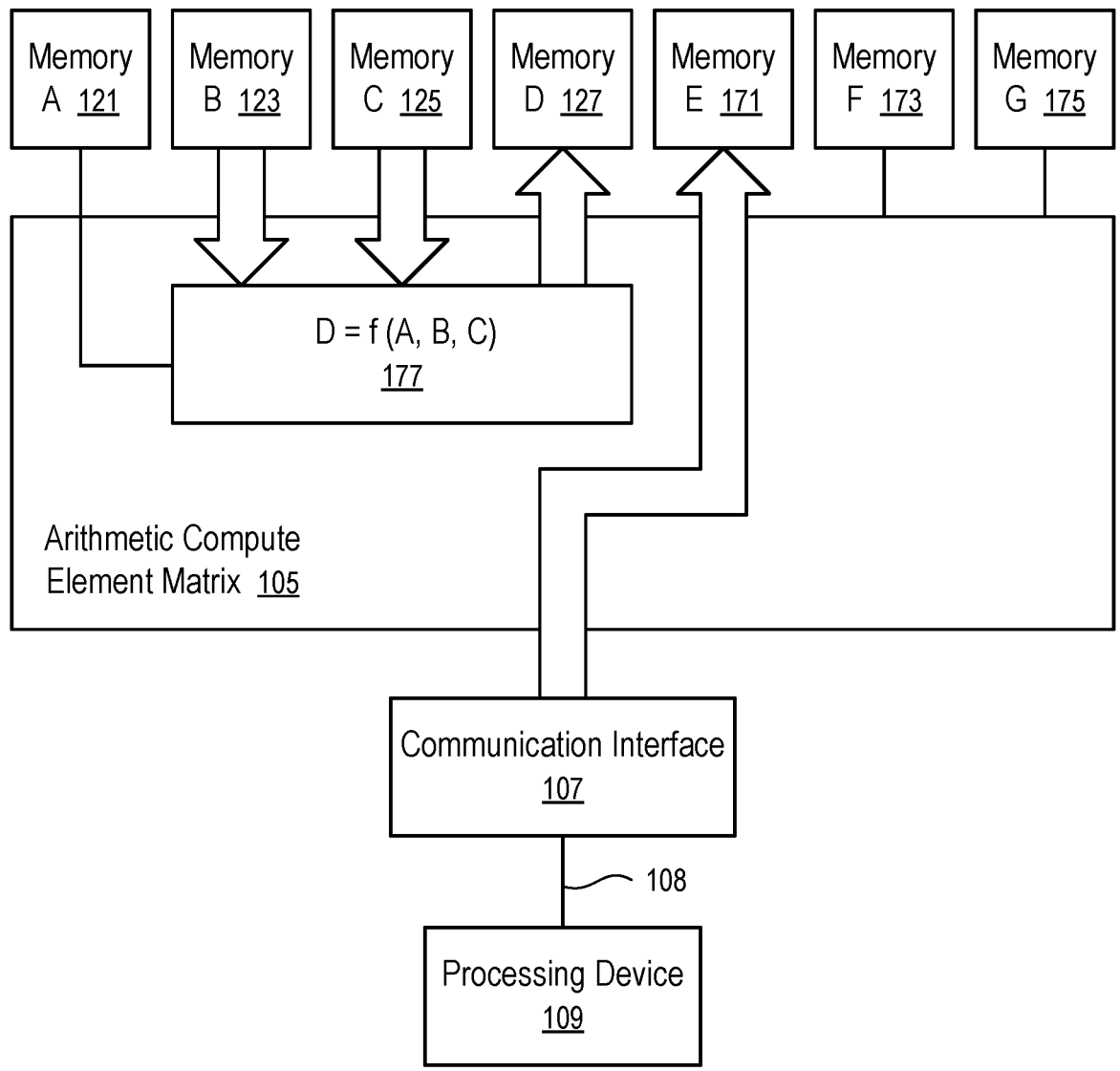
FIGS. 6 and 7 illustrate an arithmetic compute element matrix configured to output vector results generated from vector inputs according to one embodiment.
Figure 7:
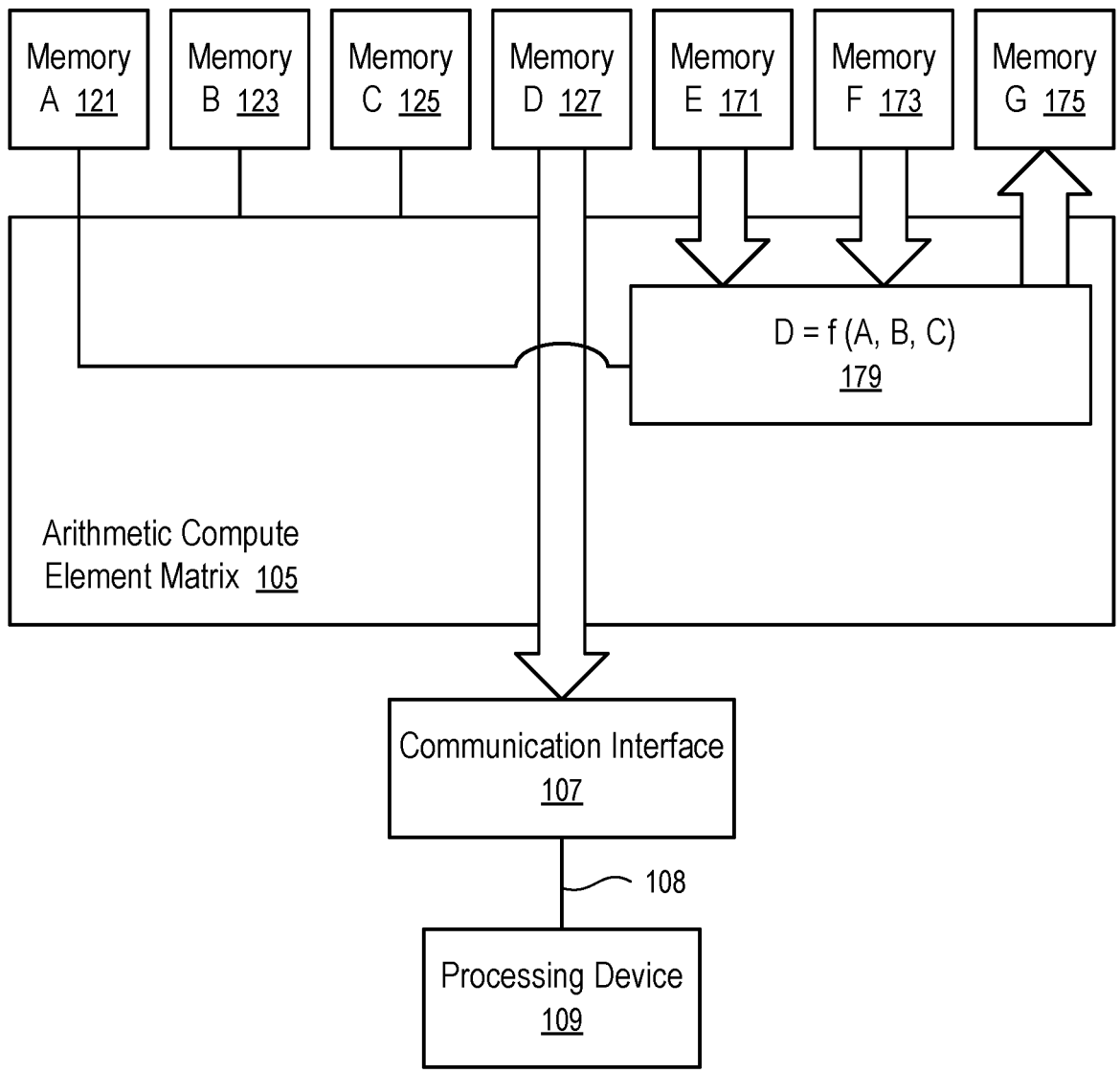

FIGS. 6 and 7 illustrate an arithmetic compute element matrix configured to output vector results generated from vector inputs according to one embodiment. For example, the arithmetic compute element matrix (105) and memory regions (121, 123, 125, 127, 171, 173, 175) of FIGS. 6 and 7 can be configured in the memory device of FIG. 1 and, optionally, use to implement the portion of the memory device illustrated in FIG. 3.

The arithmetic compute element matrix (105) of FIGS. 6 and 7 can optionally include a state machine (161) for improved capability in handling different opcodes and/or operand lists of different lengths, as illustrated in FIG. 5. Alternatively, the state machine (161) can be eliminated for simplicity; and the arithmetic compute element matrix (105) can be configured to operation on lists of operands of a predetermined list length and rely upon the external processing device (109) to program its operations for lists of other lengths.

The arithmetic compute element matrix (105) in FIGS. 6 and 7 can execute a command in a memory (121) in an autonomous mode. The command can include an opcode (131) and one or more optional parameters. Once the arithmetic compute element matrix (105) receives a request to execute the command, the arithmetic compute element matrix (105) can perform the computation (177) according to the command stored in the memory (121). The computation (177) is performed on the operands retrieved from the memory regions (123 and 125); and the results are stored in the memory region (127).

The request to execute the command can be in response to a write command received in the communication interface (107) to write an opcode (131) into a predetermined location in the memory region (121), a read command to read the opcode (131) from its location in the memory region (121), a write command to write a predetermined code into a predetermined memory location in the memory device, a read command to read from a predetermined memory location in the memory device, or another command received in the communication interface (107).

While the arithmetic compute element matrix (105) is performing the computation (177) in FIG. 6, the communication interface (107) allows the processing device (109) to access the memory region E (171) at the same time.

For example, the processing device (109) can load input data of an operand list into the memory region (171) for a next computation (179) illustrated in FIG. 7.

For example, the processing device (109) can obtain new sensor input data and load the input data into the memory region (171) for the next computation (179) illustrated in FIG. 7.

For example, the processing device (109) can copy data from another memory region into the memory region (171) for the next computation (179) illustrated in FIG. 7.

After the completion of the computation (177), the arithmetic compute element matrix (105) can receive a request to execute the next command for the computation (179) illustrated in FIG. 7. The computation (179) illustrated in FIG. 7 can be different from the computation (177) illustrated in FIG. 7. The different computations (177, 179) can be identified via different opcodes stored in the memory region A (121).

For example, during or after the computation (177) illustrated in FIG. 6, the processing device (109) can store a different opcode (131) and/or update its parameters in the memory region A (121). The updated opcode and its parameters identify the next computation (179) illustrated in FIG. 7. During or after the completion of the computation (177) illustrated in FIG. 6, the processing device (109) can trigger the new request for the computation (179) illustrated in FIG. 7.

For example, the new request can be generated by the processing device (109) sending a write command over the connection 108 to the communication interface (107) to write an opcode (131) into a predetermined location in the memory region (121), sending a read command to read the opcode (131) from its location in the memory region (121), sending a write command to write a predetermined code into a predetermined memory location in the memory device, sending a read command to read from a predetermined memory location in the memory device, or sending another command to the communication interface (107). When the command triggering the new request is received in the memory device before the completion of the current computation (177), the memory device can queue the new request for execution upon completion of the current computation (179).

In some embodiments, the memory region (e.g., 121) for storing the opcode (131) and its parameters are configured as part of the arithmetic Compute Element Matrix (105). For example, the memory region (e.g., 121) can be formed on the IC die of the arithmetic Compute Element Matrix (105) and/or the communication interface (107) that is separate from the memory IC die (103) of the operand memory regions (e.g., 123, . . . , 125) and/or the result memory region (e.g., 127).

Figure 8:
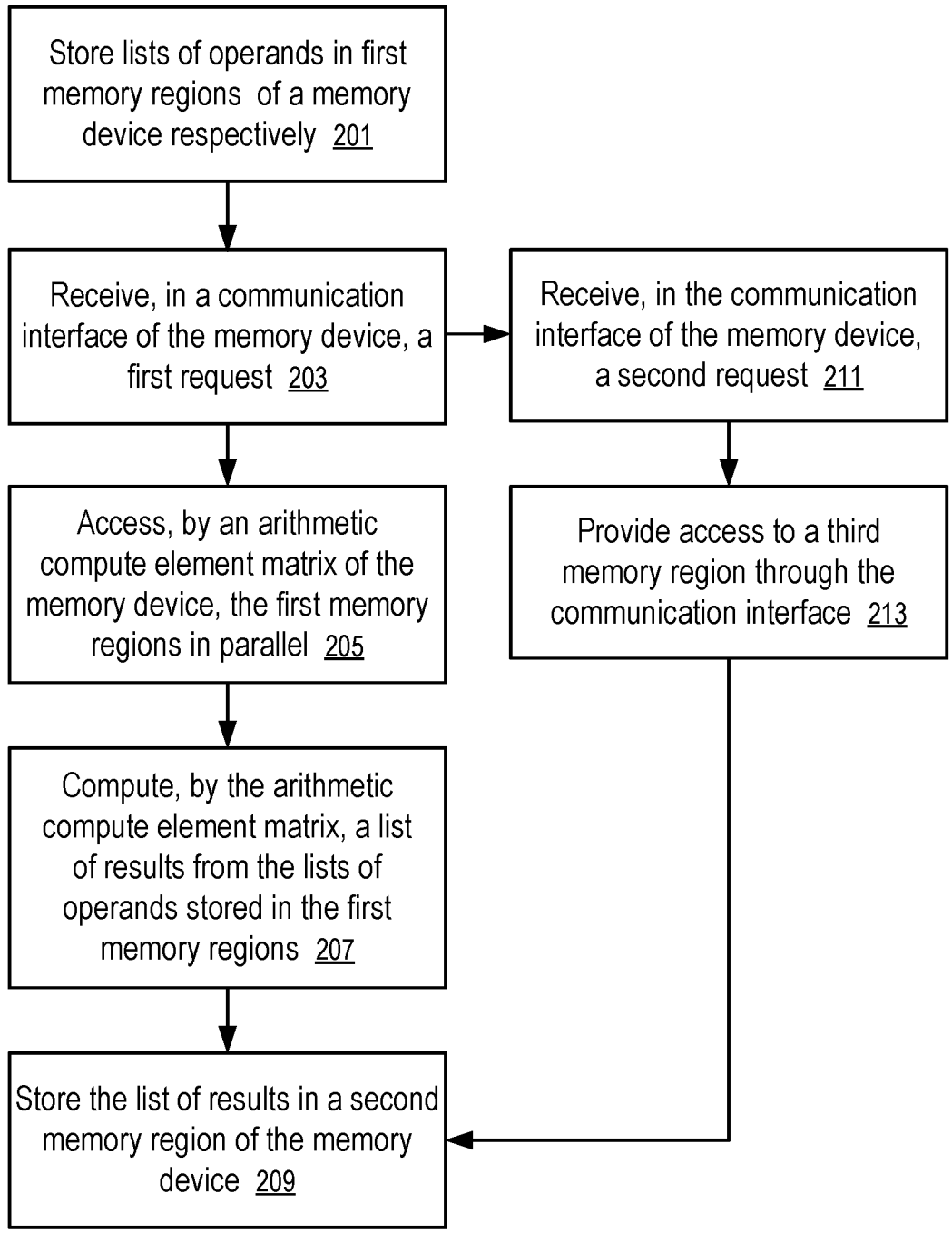
FIG. 8 shows a method to accelerate access to computations results generated from data stored in a memory device.

FIG. 8 shows a method to accelerate access to computations results generated from data stored in a memory device. For example, the method of FIG. 8 can be implemented in a memory device of FIG. 1, with a portion implemented according to FIGS. 3, 5 and/or 6-7.

At block 201, a memory device stores lists (133, . . . , 135) of operands in first memory regions (123, . . . , 125) respectively.

At block 203, a communication interface (107) of the memory device receives a first request from an external processing device (109).

At block 205, in response to the first request, an arithmetic compute element matrix (105) of the memory device accesses the first memory regions (123, . . . , 125) in parallel.

At block 207, the arithmetic compute element matrix (105) computes a list (137) of results from the lists (133, . . . , 135) of operands stored in the first memory regions (123, . . . , 125).

At block 209, the memory device stores the list (137) of results in a second memory region (127).

While the operations of blocks 205 to 209 are in progress, the operations of blocks 211 to 213 can be performed in parallel.

At block 211, the communication interface (107) of the memory device receives a second request.

At block 213, in response to the second request, the memory device provides access to a third memory region (171) through the communication interface (107).

For example, the first request can be a memory access command configured to access a memory location in the integrated circuit memory device. For example, the memory location can be configured to store an opcode (131) identifying a computation (141, 177, or 179) to be performed by the arithmetic compute element matrix (105).

For example, the computing (207) of the output (157 or 167) can be in response to the opcode being retrieved from, or stored into, a predefined memory region (111) and/or a predefined location in response to a memory access command, such as a memory read command, a memory write command, etc.

For example, the computing (207) of the output (157 or 167) can include performing an operation on a plurality of data sets in parallel to generate a plurality of results respectively, where each of the data sets includes one data element from each of the lists (133, 135, . . . , 137) of operands. The computing (207) of the output (157 or 167) can further include summing (155) the plurality of results (153) to generate the output (157).

For example, the arithmetic compute element matrix (105) can include an array (163) of arithmetic logic units (ALUs) configured to perform an operation on a plurality of data sets in parallel.

Further, the arithmetic compute element matrix (105) can include a state machine (161) configured to control the array of arithmetic logic units to perform different computations identified by different opcodes (e.g., 131).

Optionally, the state machine is further configured to control the array (163) of arithmetic logic units (ALUs) to perform computations for the lists of operands that have more data sets than the plurality of data sets that can be processed in parallel by the array (163) of arithmetic logic units (ALUs).

Optionally, the arithmetic compute element matrix (105) can include a cache memory (165) configured to store a list of results (153) generated in parallel by the array (163) of arithmetic logic units (ALUs). An optional arithmetic logic unit (155) in the arithmetic compute element matrix (105) can be used to sum the list of results (153) in the cache memory to generate a single number output.

In some implementations, the arithmetic compute element matrix can accumulate computation results of the array (163) of arithmetic logic units (ALUs) in the cache memory (153 or 165). For example, a list of the results computed from the data sets processed in parallel from the operand lists (133, 135, 137) can be added to, or accumulated in, the cache memory (153 or 165). Thus, the existing results from prior calculation of the array (163) can be summed with the new results from the current calculation of the array (163).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer processor or controller selectively activated or reconfigured by a computer program stored in the computing device. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An integrated circuit memory device, comprising:
   a plurality of memory regions formed on a first integrated circuit die; and
   an arithmetic compute element matrix formed on a second integrated circuit die different from the first integrated circuit die, wherein the arithmetic compute element matrix is coupled to and configured to access each of the plurality of memory regions in parallel;
   wherein the integrated circuit memory device, including the memory regions and the arithmetic compute element matrix, is encapsulated within an integrated circuit package; and
   wherein, in response to a first request, the arithmetic compute element matrix is configured to:
      retrieve an opcode configured to have a plurality of operands for an operation represented by the opcode, wherein the plurality of memory regions include a plurality of first memory regions configured for the plurality of operands respectively;
      access, from the plurality of first memory regions respectively according to the opcode, a plurality of operand lists corresponding to the plurality of operands of the operation respectively;
      generate a list of results from the plurality of operand lists according to the opcode; and
      store the list of results in a second memory region in the plurality of memory regions.

2. The integrated circuit memory device of claim 1, wherein, during a time period after the first request and before completion of storing the list of results into the second memory region:
   the integrated circuit memory device is configured to receive a second request to access a third memory region in the plurality of memory regions; and
   in response to the second request and during the time period, the integrated circuit memory device is configured to provide, in parallel, a memory access to the plurality of first memory regions and the second memory region to the arithmetic compute element matrix in facilitating a computation of the list of results and a memory access to the third memory region to service the second request.

3. The integrated circuit memory device of claim 2, wherein the plurality of memory regions provides a dynamic random access memory (DRAM), a cross point memory, or a flash memory, or any combination thereof.

4. The integrated circuit memory device of claim 3, further comprising:
   a set of through-silicon vias (TSVs) coupled between the first integrated circuit die and the second integrated circuit die to connect the arithmetic compute element matrix to the plurality of memory regions.

5. The integrated circuit memory device of claim 2, further comprising:
   wires encapsulated within the integrated circuit package and coupled between the first integrated circuit die and the second integrated circuit die to connect the arithmetic compute element matrix to the plurality of memory regions.

6. The integrated circuit memory device of claim 2, wherein the arithmetic compute element matrix comprises:
   an array of arithmetic logic units configured to perform an operation on a plurality of data sets in parallel, wherein each of the data sets includes one data element from each of the operand lists.

7. The integrated circuit memory device of claim 6, wherein the arithmetic compute element matrix comprises:

a state machine configured to control the array of arithmetic logic units to perform different computations identified by different codes of operations.

8. The integrated circuit memory device of claim 7, wherein the state machine is further configured to control the array of arithmetic logic units to perform computations for the operand lists that have more data sets than the plurality of data sets that are processed in parallel by the array of arithmetic logic units.

9. The integrated circuit memory device of claim 7, wherein the arithmetic compute element matrix further comprises:
a cache memory configured to store the list of results generated in parallel by the array of arithmetic logic units.

10. The integrated circuit memory device of claim 9, wherein the third memory region is the same as the second memory region.

11. The integrated circuit memory device of claim 9, wherein the third memory region is different from the second memory region.

12. The integrated circuit memory device of claim 1, wherein the plurality of memory regions includes an opcode memory region configured to store the opcode, and data identifying positions of the plurality of operand lists in the plurality of memory regions and a size of the plurality of operand lists.

13. A method, comprising:
storing an opcode in an integrated circuit memory device, the opcode having a plurality of operands;
storing a plurality of lists of operands respectively in a plurality of first memory regions formed on a first integrated circuit die of the integrated circuit memory device; and
in response to a first request received in the integrated circuit memory device, retrieving the opcode;
accessing, by an arithmetic compute element matrix of the integrated circuit memory device according to the plurality of operands of the opcode, the plurality of first memory regions in parallel, wherein the arithmetic compute element matrix is formed on a second integrated circuit die different from the first integrated circuit die;
computing, by the arithmetic compute element matrix, a list of results from the plurality of lists of operands stored in the plurality of first memory regions; and
storing, into a second memory region of the integrated circuit memory device, the list of results.

14. The method of claim 13, further comprises:
during a time period after the first request and before completion of the storing of the list of results into the second memory region, receiving a second request to access a third memory region in a plurality of memory regions; and
in response to the second request and during the time period, providing, in parallel and by the integrated circuit memory device, a memory access to the plurality of first memory regions and the second memory region to the arithmetic compute element matrix in facilitating a computation of the list of results and a memory access to the third memory region to service the second request.

15. The method of claim 14, wherein the first request is a memory access command configured to access a memory location in the integrated circuit memory device.

16. The method of claim 15, wherein the memory location stores a code identifying the computation to be performed by the arithmetic compute element matrix to generate the list of results.

17. The method of claim 16, wherein the memory location is predefined to store the code.

18. The method of claim 16, wherein the second request is a memory read command, or a memory write command, or any combination thereof.

19. The method of claim 14, wherein the computing of the list of results comprises:
performing an operation on a plurality of data sets in parallel to generate a plurality of results respectively, wherein each of the data sets includes one data element from each of the lists of operands.

20. A computing apparatus, comprising:
a processing device;
a memory device encapsulated within an integrated circuit package; and
a communication connection between the memory device and the processing device;
wherein the memory device comprises:
a plurality of memory regions formed on a first integrated circuit die; and
a plurality of arithmetic logic units coupled to access the plurality of memory regions in parallel, wherein the plurality of arithmetic logic units formed on a second integrated circuit die different from the first integrated circuit die; and
wherein, in response to a first request, the plurality of arithmetic logic units are configured to:
retrieve an opcode configured to have a plurality of operands corresponding to, among the plurality of memory regions, a plurality of first memory regions respectively;
access, according to the opcode, a plurality of lists of operands stored respectively in the plurality of first memory regions for the plurality of operands;
generate a list of results from the plurality of lists of operands according to the opcode; and
store the list of results in a second memory region in the plurality of memory regions.

21. The computing apparatus of claim 20, wherein, during a time period after the first request and before completion of storing the list of results into the second memory region, the computing apparatus is configured to receive from the processing device, a second request to access a third memory region in the plurality of memory regions; and
wherein, in response to the second request and during the time period, the memory device is configured to provide, in parallel, memory access to the plurality of first memory regions and the second memory region to the plurality of arithmetic logic units in facilitating a computation of the list of results and memory access to the third memory region to service the second request.

22. The computing apparatus of claim 21, wherein the processing device is configured to load input data into the third memory region via the second request during the time period in which the list of results are computed in the plurality of arithmetic logic units.

23. The computing apparatus of claim 22, wherein after the time period, the processing device is configured to send a third request over the communication connection to the memory device; in response to the third request, the plurality of arithmetic logic units are configured to compute a next list of results using the input data loaded into the third memory region via the second request; and, during a time period in which the next list of results is computed by the plurality of arithmetic logic units, the processing device sends a fourth request to the memory device to access the list of results computed responsive to the first request.

\* \* \* \* \*